US012436285B2

(12) United States Patent
Wyffels

(10) Patent No.: US 12,436,285 B2
(45) Date of Patent: Oct. 7, 2025

(54) SYSTEMS AND METHODS FOR TEMPORAL DECORRELATION OF OBJECT DETECTIONS FOR PROBABILISTIC FILTERING

(71) Applicant: FORD GLOBAL TECHNOLOGIES, LLC, Dearborn, MI (US)

(72) Inventor: Kevin Lee Wyffels, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1133 days.

(21) Appl. No.: 17/364,958

(22) Filed: Jul. 1, 2021

(65) Prior Publication Data

US 2023/0003886 A1 Jan. 5, 2023

(51) Int. Cl.
*G01C 3/08* (2006.01)
*G01S 17/04* (2020.01)
*G01S 17/66* (2006.01)
*G05D 1/00* (2006.01)

(52) U.S. Cl.
CPC .............. *G01S 17/66* (2013.01); *G01S 17/04* (2020.01); *G05D 1/0212* (2013.01); *G05D 1/0248* (2013.01)

(58) Field of Classification Search
CPC ....... G01S 17/66; G01S 17/04; G05D 1/0212; G05D 1/0248
See application file for complete search history.

(56) References Cited

U.S. PATENT DOCUMENTS

| 10,436,615 | B2 | 10/2019 | Agarwal et al. | |
|---|---|---|---|---|
| 11,776,215 | B1 * | 10/2023 | Cheng | G06F 3/04847 345/419 |
| 2015/0363940 | A1 * | 12/2015 | Held | G06T 7/207 382/107 |
| 2019/0086923 | A1 * | 3/2019 | Zhang | G01S 17/58 |
| 2020/0312156 | A1 * | 10/2020 | Sakamaki | G08G 5/723 |

FOREIGN PATENT DOCUMENTS

WO 20190222364 A1 11/2019

OTHER PUBLICATIONS

"What's the Difference Between Frame-and Event-Based LiDAR?," https://www.electronicdesign.com/markets/automotive/article/21152870/terranet.
Sualeh M. et al., "Dynamic Multi-LiDAR Based Multiple Object Detection and Tracking," Sensors 2019, 19, 1474, doi:10.3390/s19061474, www.mdpi.com/journal.sensors.

(Continued)

*Primary Examiner* — Mark Hellner
(74) *Attorney, Agent, or Firm* — Frank A. MacKenzie; Brooks Kushman, P.C.

(57) ABSTRACT

Systems and methods for tracking an object. The method comprising: receiving, by a processor, a series of observations made over time for the object; selecting, by the processor, a plurality of sets of observations using the series of observations; causing, by the processor, the plurality of sets of observations to be used by at least one filter to generate a track for the object (wherein the at least one filter uses sensor data associated with each of a plurality of frames of sensor data only once during generation of the track); and causing, by the processor, operations of an autonomous robot to be controlled based on the track for the object.

16 Claims, 9 Drawing Sheets

(56) References Cited

OTHER PUBLICATIONS

Huang, R. et al., "An LSTM Approach to Temporal 3D Object Detection in LiDAR Point Clouds," arXiv:2007.12392v1 [cs.CV] Jul. 24, 2020.
International Search Report and Written Opinion dated Oct. 3, 2022 for International Application No. PCT/US2022/072834 (9 pages).

* cited by examiner

Table 400

| Cycle | Filter | Observations |
|---|---|---|
| $C_1$ | $306_1$ | $C_1, C_2, C_3$ |
| | $306_2$ | $C_2, C_3, C_4$ |
| | $306_3$ | $C_3, C_4, C_5$ |
| $C_2$ | $306_1$ | $C_4, C_5, C_6$ |
| | $306_2$ | $C_5, C_6, C_7$ |
| | $306_3$ | $C_6, C_7, C_8$ |
| ⋮ | ⋮ | ⋮ |

$(f_1, f_2, f_3), f_4, f_5, f_6, f_7, f_8, f_9, ..., f_n$
$f_1, (f_2, f_3, f_4), f_5, f_6, f_7, f_8, f_9, ..., f_n$
$f_1, f_2, (f_3, f_4, f_5), f_6, f_7, f_8, f_9, ..., f_n$
$f_1, f_2, f_3, (f_4, f_5, f_6), f_7, f_8, f_9, ..., f_n$
$f_1, f_2, f_3, f_4, (f_5, f_6, f_7), f_8, f_9, ..., f_n$
$f_1, f_2, f_3, f_4, f_5, (f_6, f_7, f_8), f_9, ..., f_n$

Moving Window of length M (e.g., 3).
Tracker comprises N filters (e.g., 3 filters)

FIG. 4

Table 500

| Cycle | Filter | Observations | Filter Operation |
|---|---|---|---|
| 1 | $306_1$ | $C_1, C_2, C_3$ | $x_{t-2}(c_1, x_0), x_{t-1}(c_2, x_{t-2}), x_t(c_3, x_{t-1})$ |
| | $306_2$ | $C_2, C_3, C_4$ | $x_{t-1}(c_2, x_0), x_t(c_3, x_{t-1}), x_{t+1}(c_4, x_t)$ |
| | $306_3$ | $C_3, C_4, C_5$ | $x_{t+2}(c_3, x_0), x_{t+1}(c_4, x_{t+2}), x_{t+2}(c_5, x_{t+1})$ |
| 2 | $306_1$ | $C_4, C_5, C_6$ | $x_{t+1}(c_4, x_t), x_{t+2}(c_5, x_{t+1}), x_{t+3}(c_6, x_{t+2})$ |
| | $306_2$ | $C_5, C_6, C_7$ | $x_{t+2}(c_5, x_{t+1}), x_{t+3}(c_6, x_{t+2}), x_{t+4}(c_7, x_{t+3})$ |
| | $306_3$ | $C_6, C_7, C_8$ | $x_{t+3}(c_6, x_{t+2}), x_{t+4}(c_7, x_{t+3}), x_{t+5}(c_8, x_{t+4})$ |
| ⋮ | ⋮ | ⋮ | ⋮ |

FIG. 5

SYSTEMS AND METHODS FOR TEMPORAL DECORRELATION OF OBJECT DETECTIONS FOR PROBABILISTIC FILTERING

BACKGROUND

Statement of the Technical Field

The present disclosure relates generally to object detection systems. More particularly, the present disclosure relates to implementing systems and methods for temporal decorrelation of object detections for probabilistic filtering.

Description of the Related Art

Object detection algorithms based on deep learning may operate on a temporal window of sensor data rather than on a single frame of sensor data. These object detection algorithms suffer from certain drawbacks. For example, object detections output from such algorithms are correlated over time which directly violates a foundational assumption of efficient estimators operating on those object detections.

SUMMARY

The present disclosure concerns implementing systems and methods for tracking an object and/or controlling an autonomous robot. The methods comprise performing the following operations by a processor: receiving a series of observations made over time for the object; selecting a plurality of sets of observations using the series of observations; causing the plurality of sets of observations to be used by at least one filter to generate a track for the object (wherein the at least one filter uses sensor data associated with each of a plurality of frames of sensor data only once during generation of the track); and causing operations of an autonomous robot (e.g., an autonomous vehicle) to be controlled based on the track for the object.

In some scenarios, each observation is defined by a cuboid comprising LiDAR data points and/or is associated with a single frame of sensor data. Each set may be selected to comprise observations that are different from observations contained in all other sets. The filter can include, but is not limited to, a Kalman filter.

In those or other scenarios, the methods comprise causing the plurality of sets of observations to be used by a first filter and a second filter to generate the track for the object. Each of the first and second filters uses sensor data associated with each of the frames of sensor data only once during generation of the track. The track may comprise a sequence of object states sequentially generated by the first and second filters using respective ones of the plurality of sets of observations. At least two of the different sets of observations may comprise at least one observation in common. The sets of observations are selected from the series of observations to ensure that the filter(s) use(s) sensor data associated with each of the frames of sensor data only once during generation of the track.

The implementing systems comprise a processor and a non-transitory computer-readable storage medium comprising programming instructions that are configured to cause the processor to implement the above described methods.

BRIEF DESCRIPTION OF THE DRAWINGS

The present solution will be described with reference to the following drawing figures, in which like numerals represent like items throughout the figures.

FIGS. 4-5 provides tables that are useful for understanding operations of the tracker shown in FIG. 3.

DETAILED DESCRIPTION

Figure 1:
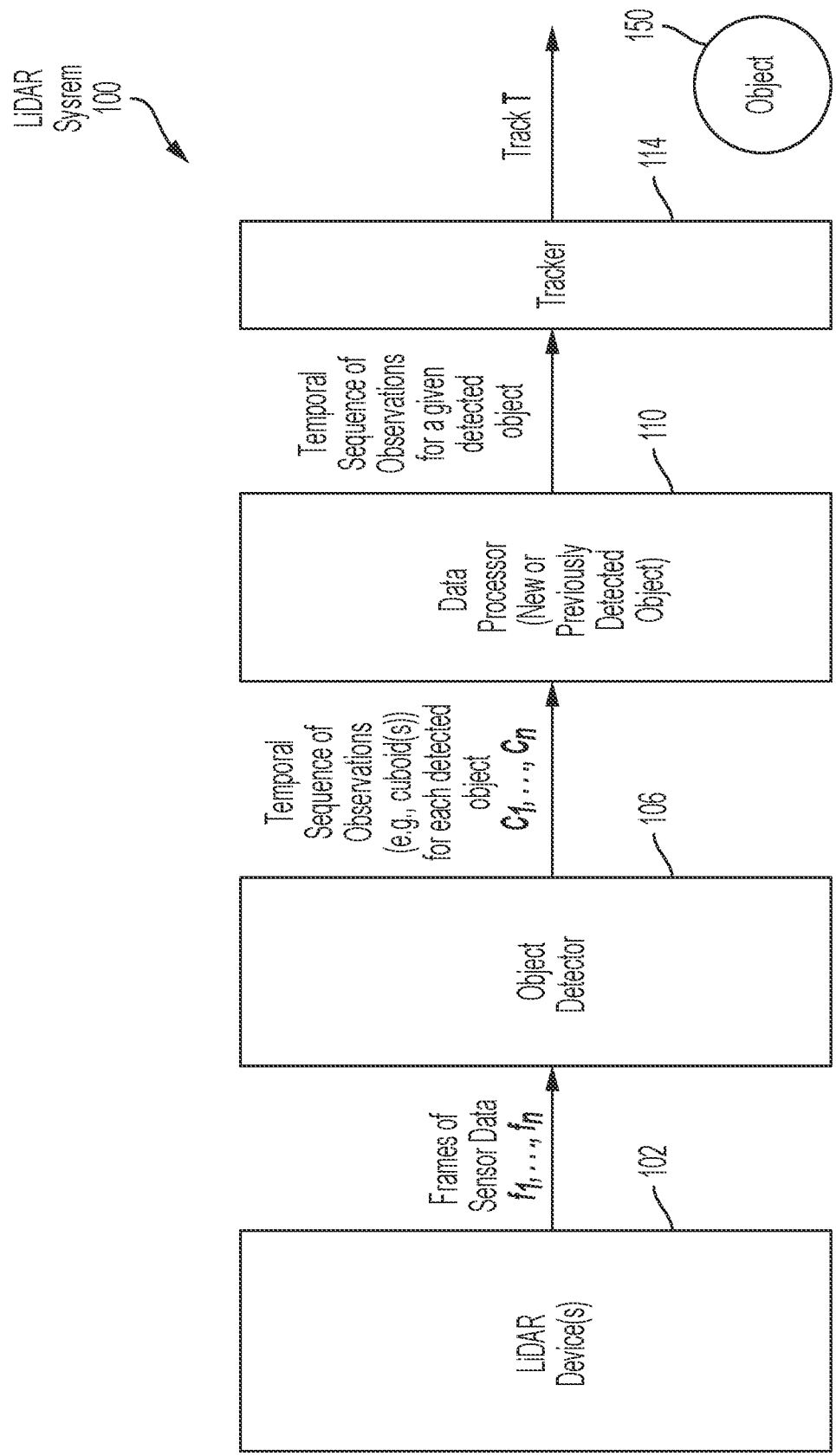
FIG. 1 provides an illustration of a LiDAR system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or a human operator may override the vehicle's autonomous system and may take control of the vehicle, or it may be a human-operated vehicle equipped with an advanced driver assistance system.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Conventional object detection algorithms based on deep learning may operate on a temporal window of sensor data rather than on a single frame of sensor data. These object detection algorithms suffer from certain drawbacks. For example, object detections output from such algorithms are correlated over time which directly violates a foundational assumption of efficient estimators operating on those object detections. The present solution solves this drawback of convention object detection algorithms.

The present solution concerns implementing systems and methods for tracking an object and/or controlling an autonomous robot. The methods generally involve performing the following operations by a processor or circuit: receiving a series of observations made over time for the object; selecting a plurality of sets of observations using the series of observations; causing the plurality of sets of observations to be used by at least one filter to generate a track for the object (wherein the at least one filter uses sensor data associated with each of a plurality of frames of sensor data only once during generation of the track); and/or causing operations of an autonomous robot (e.g., an autonomous vehicle) to be controlled based on the track for the object.

The present solution can be used in various applications. Such applications can include, but are not limited to, radar system applications, LiDAR system applications, camera system applications, robotic applications, autonomous vehicle applications, and/or semi-autonomous vehicle applications. The present solution will be described below in relation to LiDAR system applications and autonomous vehicle. The present solution is not limited in this regard.

Illustrative LiDAR Systems

The present solution concerns a LiDAR system for detecting the presence, direction, distance and speed of objects, which may include moving actors, stationary objects, or both. The objects can include vehicles, ships, aircrafts, pedestrians, animals, trees and/or buildings. An illustration of an illustrative LiDAR system 100 is provided in FIG. 1. As shown in FIG. 1, the LiDAR system 100 comprises LiDAR device(s) 102. An illustrative architecture for a LiDAR device will be discussed below in relation to FIG. 2. The LiDAR system 100 also comprises an object detector 106, a data processor 110 and a tracker 114. The object detector 106, data processor 110 and/or tracker 114 can include, but is(are) not limited to, a computing device such as that shown in FIG. 9.

During operation, the LiDAR device(s) 102 perform(s) operations to generate frames of sensor data (e.g., point cloud data) $f_1, f_2, \ldots, f_n$. Techniques for generating frames of sensor data are well known. The frames are passed to the object detector 106. The object detector 106 processes the frames of sensor data to (i) identify object(s) in proximity to the LiDAR device(s) and (ii) generate a temporal sequence of observations or a series of observations made over time $c_1, c_2, \ldots, c_n$ for each detected object. The observations can include, but are not limited to, cuboids comprising data points in the LiDAR point clouds. Techniques for object detection based on LiDAR datasets are well known. Techniques for generating cuboids and temporal sequences of cuboids are well known. Each cuboid specifies a position, size, orientation and/or velocity of a given object. For example, a cuboid may be defined by an x-axis coordinate for a centroid, a y-axis coordinate for the centroid, a z-axis coordinate for the centroid, a roll value, a pitch value, a yaw value, an x-axis coordinate for a linear velocity, a y-axis coordinate for the linear velocity, and a z-axis coordinate for the linear velocity.

The temporal sequence of observations $c_1, c_2, \ldots, c_n$ for each detected object is passed to the data processor 110. The data processor 110 performs operations to determine whether the detected object has or has not been previously detected. This determination can be made based on information stored in a datastore indicating that prior observations were associated with a previously detected object (e.g., a pedestrian, a vehicle, an animal, etc.). If such information is not present in the datastore, then a determination is made that the detected object has not been previously detected. If the object has been previously detected, then the temporal sequence of observations is associated with the previously detected object. Once this object association is made, the temporal sequence of observations is passed to tracker 114.

Tracker 114 uses the temporal sequence of observations to determine a track T for the given detected object. The manner in which the track is determined will be discussed in detail below in relation to FIGS. 3-5. The track T provides a spatial description for the given object. The track (or spatial description) includes a temporal sequence of states $x_1, x_2, \ldots, x_t$ for the given object. Each state may be defined by a centroid location (e.g., an x-coordinate, a y-coordinate, a z-coordinate), a roll value, a pitch value, a yaw value, and/or a velocity (i.e., speed plus a direction of travel).

Figure 2:
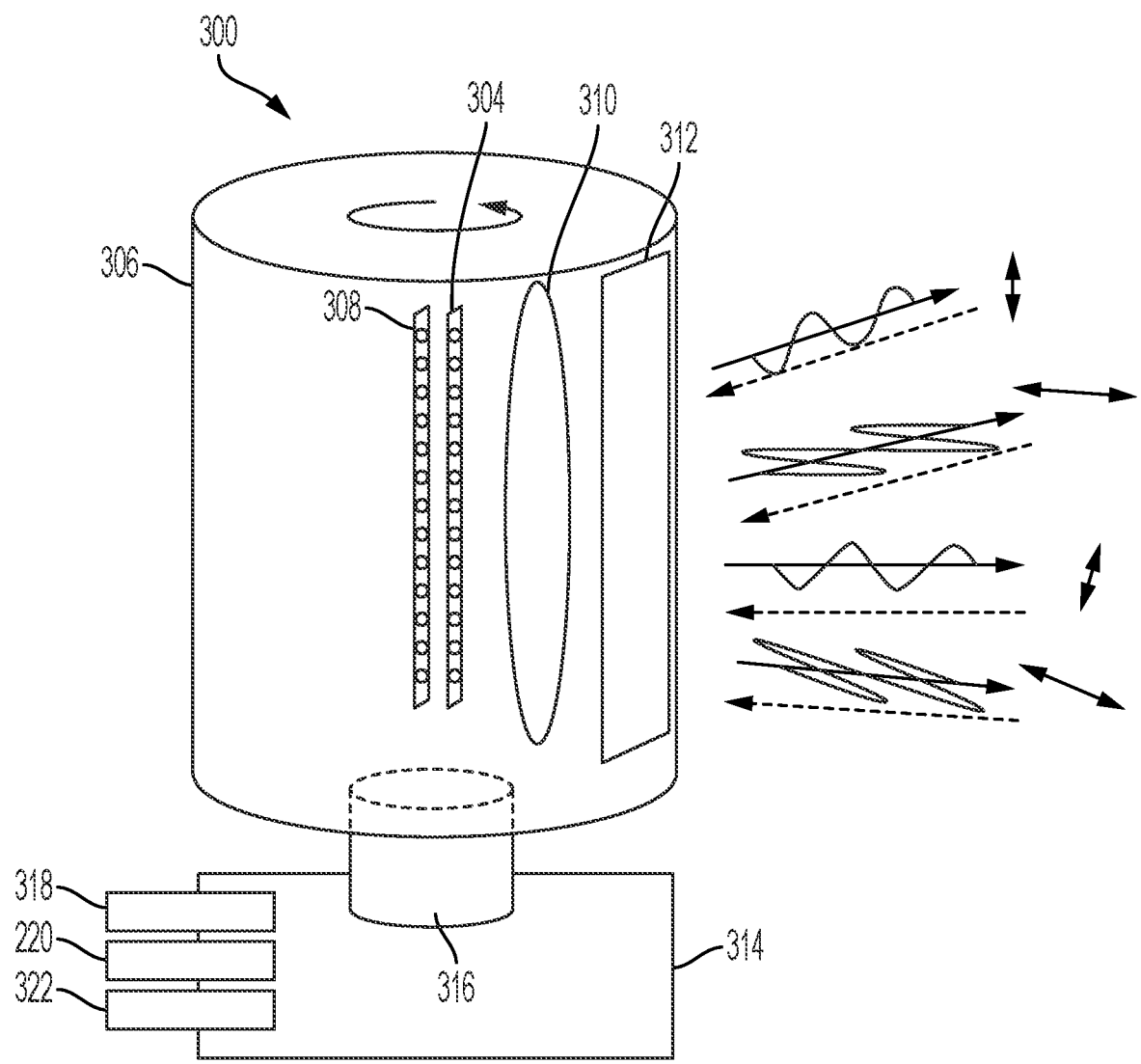
FIG. 2 provides an illustration of a LiDAR device.

Referring now to FIG. 2, there is provided an illustration of an illustrative LiDAR device 200. LiDAR device 102 of FIG. 1 is the same as or similar to LiDAR device 200. Thus, the following discussion of LiDAR device 200 is sufficient for understanding LiDAR device 102.

As shown in FIG. 2, the LiDAR system 200 includes a housing 206 which may be rotatable 360° about a central axis such as hub or axle 216. The housing may include an emitter/receiver aperture 212 made of a material transparent to light. Although a single aperture is shown in FIG. 2, the present solution is not limited in this regard. In other scenarios, multiple apertures for emitting and/or receiving light may be provided. Either way, the LiDAR system 200 can emit light through one or more of the aperture(s) 212 and receive reflected light back toward one or more of the aperture(s) 211 as the housing 206 rotates around the internal components. In alternative scenarios, the outer shell of housing 206 may be a stationary dome, at least partially made of a material that is transparent to light, with rotatable components inside of the housing 206.

Inside the rotating shell or stationary dome is a light emitter system 204 that is configured and positioned to generate and emit pulses of light through the aperture 212 or through the transparent dome of the housing 206 via one or more laser emitter chips or other light emitting devices. The light emitter system 204 may include any number of individual emitters (e.g., 8 emitters, 64 emitters, or 128 emitters). The emitters may emit light of substantially the same intensity or of varying intensities. The individual beams emitted by the light emitter system 204 will have a well-defined state of polarization that is not the same across the entire array. As an example, some beams may have vertical polarization and other beams may have horizontal polarization. The LiDAR system will also include a light detector 208 containing a photodetector or array of photodetectors positioned and configured to receive light reflected back into the system. The light emitter system 204 and light detector 208 would rotate with the rotating shell, or they would rotate inside the stationary dome of the housing 206. One or more optical element structures 210 may be positioned in front of the light emitter system 204 and/or the light detector 208 to serve as one or more lenses or wave plates that focus and direct light that is passed through the optical element structure 210.

One or more optical element structures 210 may be positioned in front of a mirror 212 to focus and direct light that is passed through the optical element structure 210. As shown below, the system includes an optical element structure 210 positioned in front of the mirror 212 and connected to the rotating elements of the system so that the optical element structure 210 rotates with the mirror 212. Alternatively or in addition, the optical element structure 210 may include multiple such structures (for example lenses and/or wave plates). Optionally, multiple optical element structures 210 may be arranged in an array on or integral with the shell portion of the housing 206.

Optionally, each optical element structure 210 may include a beam splitter that separates light that the system receives from light that the system generates. The beam splitter may include, for example, a quarter-wave or half-wave wave plate to perform the separation and ensure that received light is directed to the receiver unit rather than to the emitter system (which could occur without such a wave plate as the emitted light and received light should exhibit the same or similar polarizations).

The LiDAR system will include a power unit 218 to power the light emitter system 204, a motor 216, and electronic components. The LiDAR system will also include an analyzer 214 with elements such as a processor 222 and non-transitory computer-readable memory 220 containing programming instructions that are configured to enable the system to receive data collected by the light detector unit, analyze it to measure characteristics of the light received, and generate information that a connected system can use to make decisions about operating in an environment from which the data was collected. Optionally, the analyzer 214 may be integral with the LiDAR system 200 as shown, or some or all of it may be external to the LiDAR system and communicatively connected to the LiDAR system via a wired or wireless communication network or link.

Figure 3:
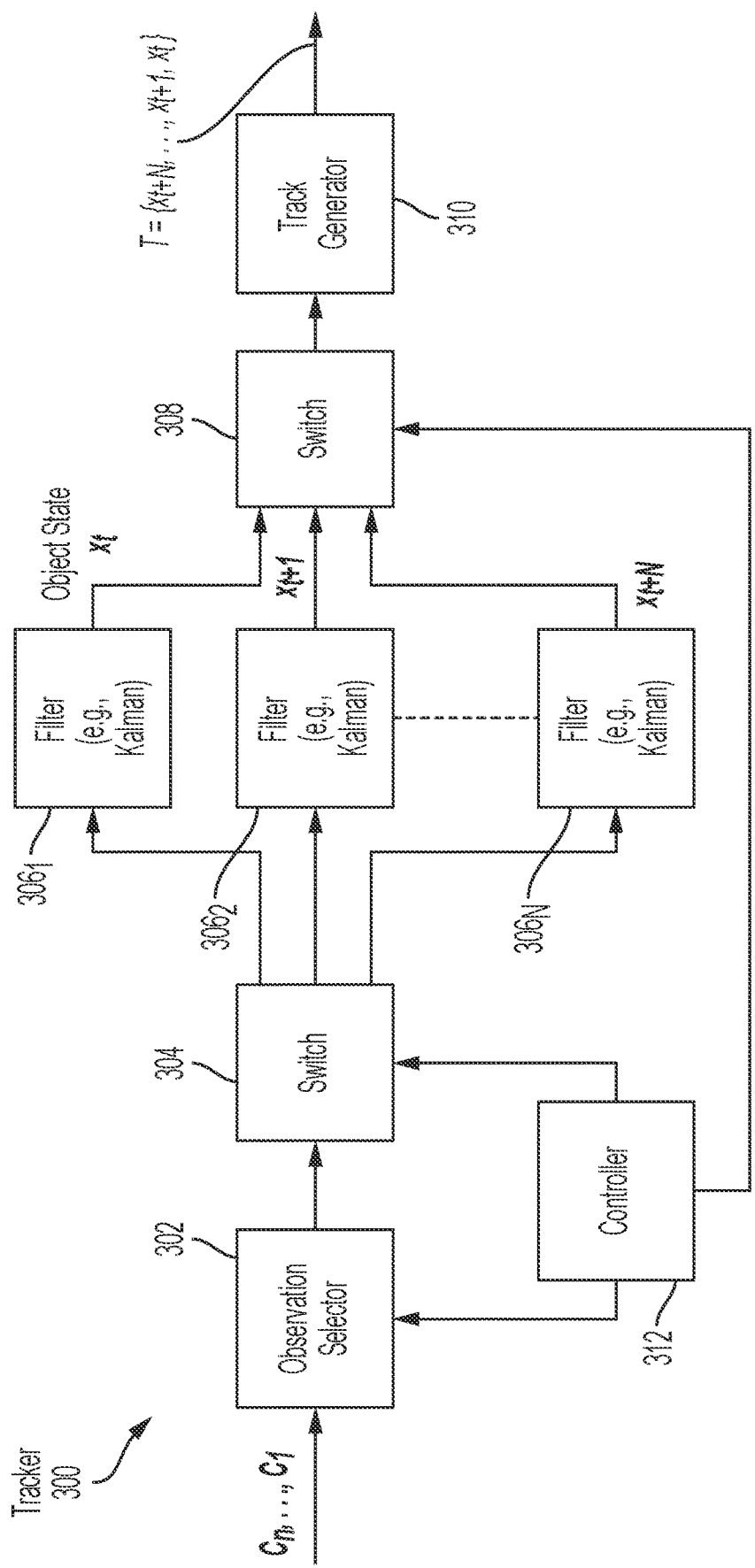
FIG. 3 provides an illustration of a tracker.

Referring now to FIG. 3, there is provided an illustration of a tracker architecture 300. Tracker 112 of FIG. 1 can be the same as or similar to tracker 300. Thus, the discussion of tracker 300 is sufficient for understanding tracker 112 of FIG. 1.

As shown in FIG. 3, tracker 300 comprises an observation selector 302, switches 304, 308, filters $306_1$, $306_2$, ..., $306_N$, a track generator 310, and a controller 312. Controller 312 is operative to control operations of components 302, 304, 308. For example, controller 312 provides: control signals to observation selector 302 to facilitate selection of observation (e.g., cuboids) from a temporal sequence of observations or series of observations made over time $c_1$, $c_2$, ..., $c_n$ input into the tracker 300; provides control signals to switch 304 for selectively coupling the observation selector 302 to filters $306_1$, $306_2$, ..., $306_N$; and provides control signals to switch 308 for selectively coupling $306_1$, $306_2$, ..., $306_N$ to the track generator 310.

During each cycle of operations performed by tracker 300, switch 304 is controlled such that select observations (e.g., cuboids) are provided to and processed by filters $306_1$, $306_2$, ..., $306_N$ in a sequential manner. For example, filter $306_1$ is provided with a first set of observations (e.g., cuboids) from observation selector 302 via switch 304 during a first cycle. Filter $306_1$ processes the observations to generate an object state $x_t$ at time t, which is provided to the track generator 310 via switch 308. Next, filter $306_2$ is provided a second different set of observations (e.g., cuboids) from observation selector 302 via switch 304 and processes the same to generate an object state $x_{t+1}$ at time t+1, which is provided to the track generator 310 via switch 308. This process is repeated until track generator 310 has received an object state $x_{t+N}$ from filter $306_N$. A next cycle of operations for the given object or another object is performed by tracker 300. The track generator 310 generates a track T by arranging the object states as a sequence of object states $\{x_t, x_{t+1}, ..., x_{t+N}\}$.

Notably, the observations (e.g., cuboids) are selected by the observation selector 302 such that each filter does not process LiDAR data from the same frame twice. This is different than what is done in conventional trackers. In conventional trackers, the filters process LiDAR data from the same frame multiple times which results in the above-mentioned drawbacks which are solved by the present solution.

The observation selection process of the present solution will now be described in detail in relation to a scenario of FIG. 4. In this scenario, the tracker 300 comprises three filters $306_1$, $306_2$, $306_3$. Thus, switch 304 has three positions: a first position connecting observation selector 302 to filter $306_1$; a second position connecting observation selector 302 to filter $306_2$; and a third position connecting observation selector 302 to filter $306_3$. The switch 304 is cycled through these three positions. Each cycle $C_1$, $C_2$, ..., $C_M$ referenced in table 400 refers to an iteration of the switch 304 being cycled through the three positions.

During a first cycle $C_1$, observation selector 302 selects a first set of observations (e.g., cuboids) $c_1$, $c_2$, $c_3$ which are associated with frames of sensor data $f_1$, $f_2$, $f_3$. The selected observations (e.g., cuboids) $c_1$, $c_2$, $c_3$ are provided to filter $306_1$ via switch 304. Filter $306_1$ processes the observations (e.g., cuboids) $c_1$, $c_2$, $c_3$ to generate an object state $x_t$ at time t, which is provided to the track generator 310 via switch 308. Thereafter, observation selector 302 selects a second different set of observations (e.g., cuboids) $c_2$, $c_3$, $c_4$ which are associated with frames of sensor data $f_2$, $f_3$, $f_4$. The selected observations (e.g., cuboids) $c_2$, $c_3$, $c_4$ are provided to filter $306_2$ via switch 304. Filter $306_2$ processes the observations (e.g., cuboids) $c_2$, $c_3$, $c_4$ to generate an object state $x_{t+1}$ at time t+1, which is provided to the track generator 310 via switch 308. Subsequently, observation selector 302 selects a third different set of observations (e.g., cuboids) $c_3$, $c_4$, $c_5$ which are associated with frames of sensor data $f_3$, $f_4$, $f_5$. The selected observations (e.g., cuboids) $c_3$, $c_4$, $c_5$ are provided to filter $306_3$ via switch 304. Filter $306_3$ processes the observations (e.g., cuboids) $c_3$, $c_4$, $c_5$ to generate an object state $x_{t+2}$ at time t+2, which is provided to the track generator 310 via switch 308.

During a second cycle $C_2$, observation selector 302 selects a fourth set of observations (e.g., cuboids) $c_4$, $c_5$, $c_6$ which are associated with frames of sensor data $f_4$, $f_6$. The selected observations (e.g., cuboids) $c_4$, $c_5$, $c_6$ are provided to filter $306_1$ via switch 304. Filter $306_1$ processes the observations (e.g., cuboids) $c_4$, $c_5$, $c_6$ to generate an object state $x_{t+3}$ at time t+3, which is provided to the track generator 310 via switch 308. Thereafter, observation selector 302 selects a fifth different set of observations (e.g., cuboids) $c_5$, $c_6$, $c_7$ which are associated with frames $f_5$, $f_6$, $f_7$. The selected observations (e.g., cuboids) $c_5$, $c_6$, $c_7$ are provided to filter $306_2$ via switch 304. Filter $306_2$ processes the observations (e.g., cuboids) $c_5$, $c_6$, $c_7$ to generate an object state $x_{t+4}$ at time t+4, which is provided to the track generator 310 via switch 308. Subsequently, observation selector 302 selects a sixth different set of observations (e.g., cuboids) $c_6$, $c_7$, $c_8$ which are associated with frames $f_6$, $f_7$, $f_8$. The selected observations (e.g., cuboids) $c_6$, $c_7$, $c_8$ are provided to filter $306_3$ via switch 304. Filter $306_3$ processes the observations (e.g., cuboids) $c_6$, $c_7$, $c_8$ to generate an object state $x_{t+5}$ at time t+5, which is provided to the track generator 310 via switch 308.

Notably, each of the filters processes the observations (e.g., cuboids) associated with different frames of point cloud data during cycles $C_1$ and $C_2$. For example, filter $306_1$ processes observations (e.g., cuboids) that are associated with frames $f_1$, $f_2$, $f_3$ during cycle $C_1$ and processes observations (e.g., cuboids) that are associated with frames $f_4$, $f_5$, $f_6$ during cycle $C_2$. This novel feature of the present solution provides more accurate object tracks as compared to that of conventional trackers in which each filter processes sensor data from the same frame during multiple cycles (i.e., point cloud data associated with frame $f_2$ is processed by a particular filter during both cycles $C_1$ and $C_2$).

In some scenarios, the filters $306_1$, $306_2$, ..., $306_N$ comprise Kalman filters. Kalman filters are well known as implementing an algorithm that provide estimates of unknown variables given observations made over time. In object detection applications, the unknown variables can include, but are not limited to, an object state $x_t$ (position and velocity) at a time t, an object position $p_t$ at a time t, and/or an object velocity $v_t$ at a time t. The object position and velocity are defined in an x-axis, a y-axis, and a z-axis. The object state may be defined as a cuboid with a greater degree of accuracy as compared to the cuboids input into the tracker 300. Thus, each object state may include, but is not limited to, an x-axis coordinate for a centroid, a y-axis coordinate for the centroid, a z-axis coordinate for the centroid, a roll value, a pitch value, a yaw value, an x-axis coordinate for a linear velocity, a y-axis coordinate for the linear velocity, and a z-axis coordinate for the linear velocity.

The object state at time t can be predicted based on the previous object state at time t−1. This prediction of object state $x_t$ can be made in accordance with the following mathematical equations (1) and (2).

$$x_{t|t-1} = F_{t-1} * x_{t-1} \quad (1)$$

$$x_t = K_t c_n + (1 - K_t) x_{t|t-1} \quad (2)$$

where $x_{t|t-1}$ denotes a predicted object state $x_t$ conditioned on measurements or observations through time t−1, $F_{t-1}$ denotes a matrix that encodes a linear function of a dynamics model (e.g., position p plus velocity v times delta t, i.e., p+vΔt), $x_{t-1}$ denotes an estimated object state at time t−1, $x_t$ denotes an estimated object state at time t, $K_t$ denotes a Kalman gain, and $c_n$ denotes an observation (e.g., cuboid). The present solution is not limited to the mathematical equations (1) and (2). Other mathematical equations can be employed here for implementing a Kalman filter or other filter operative to predict or estimate an object state using sensor data.

In the scenario of FIGS. 4-5, each filter $306_1$, $306_2$, $306_3$ could recursively perform mathematical equations (1) and (2) using the respective observations (e.g., cuboids) in sequence during each cycle. For example, filter $306_1$ sequentially performs three iterations of mathematical equations (1, 2) during cycle C1 to generate (i) object state $x_{t-2}$ based on observation (e.g., cuboid) $c_1$ and an initial object state $x_0$, (ii) object state $x_{t-1}$ based on observation (e.g., cuboid) $c_2$ and previously computed object state $x_{t-2}$, and (iii) object state $x_t$ based on observation (e.g., cuboid) $c_3$ and previously computed object state $x_{t-1}$. The present solution is not limited to the particulars of this scenario.

An additional benefit of the present solution is that the tracker 300 still outputs state updates at the same frequency of the sensor, i.e. there is an updated x output for every f/c input. An alternative approach to "decorrelate" the input would be to have a single filter that only processes every $N^{th}$ set of cuboids (where N is 3 in the examples demonstrated in FIGS. 3, 4, 5). The downside to this alternative approach is that the frequency of updates would drop to 1/N times the sensor frequency, which would increase the reaction time of the autonomous vehicle to a potentially dangerous level.

Figure 6:
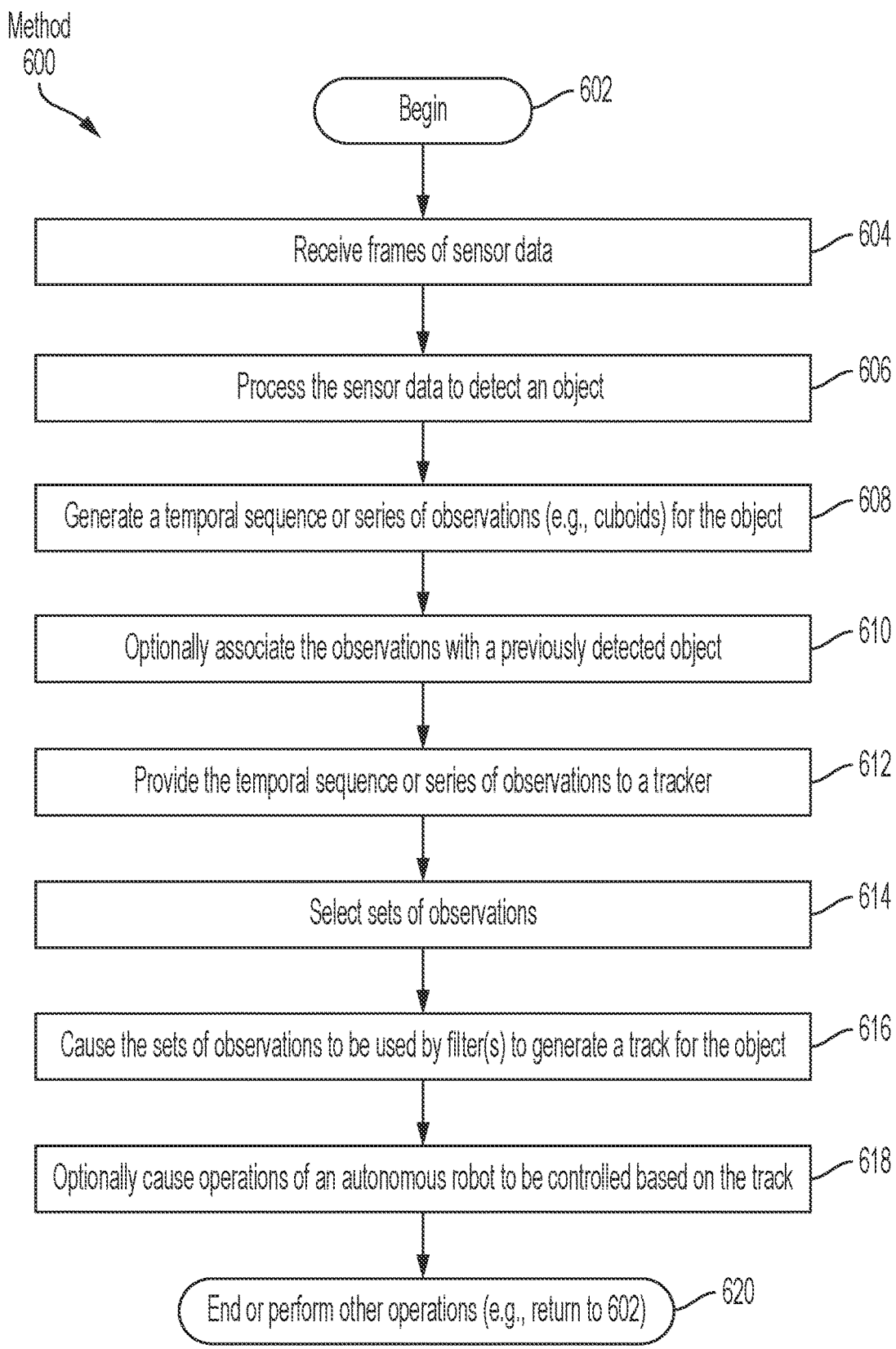
FIG. 6 provides a flow diagram of an illustrative method for tracking objects.

Referring now to FIG. 6, there is provided an illustrative method 600 for operating an object tracking system (e.g., LiDAR system 100 of FIG. 1). Method 600 begins with 602 and continues with 604 where frames of sensor data (e.g., frames of point cloud data $f_1$, ..., $f_n$ of FIG. 1) are received by an object detector (e.g., object detector 106 of FIG. 1) from sensor device(s) (e.g., LiDAR device(s) 102 of FIG. 1 and/or other sensor device(s) such as radar system(s)). The sensor data can include, but is not limited to, frames of point cloud information defining point clouds. Each point cloud comprises a plurality of data points plotted on a 3D graph. The object detector can include, but is not limited to, a computing device (such as that described below in relation to FIG. 9).

In 606, the object detector performs operations to detect one or more objects based on the sensor data. Techniques for detecting objects based on sensor data are well known. The object detector also generates a temporal sequence of observations (e.g., cuboids) for each detected object, as shown by 608. Techniques for generating observations (e.g., cuboids) from sensor data are well known. The observations (e.g., cuboids) can be optionally be associated with a previously detected object in 610. Each observation may be associated with a single frame of sensor data.

Next in 612, the temporal sequence or series of observations (e.g., cuboids) is provided to a tracker (e.g., tracker 114 of FIG. 1). At the tracker, sets of observations are selected in 614 using the temporal sequence or series of observations. The sets of observations are selected from the series of observations to ensure that each filter uses sensor data associated with each frames of sensor data only once during generation of the track for the given object. When a single filter is used to generate the track, each set may be selected to comprise observations that are different from observations contained in all other sets. When two or more filters are used to generate the track, at least two of the sets of observations may comprise at least one observation in common.

In 616, the sets of observations are used by filter(s) (e.g., a Kalman filter) to generate the track for the object. The filter(s) use(s) sensor data associated with each of the frames of sensor data only once during generation of the track. For example, the sets of observations are used by a first filter and a second filter to generate the track for the object. Each of the first and second filters uses sensor data associated with each frame of sensor data only once during generation of the track. The track may comprise a sequence of object states sequentially generated by the first and second filters using respective ones of the sets of observations. The present solution is not limited in this regard.

In 618, operations of an autonomous robot (e.g., an autonomous vehicle) may be optionally controlled based on the track for the object. For example, an articulating arm on the autonomous robot may be caused to move in a given way so as to capture the object or avoid the object based on the object's track. Additionally or alternatively, the autonomous robot is caused to travel along a given trajectory which avoids collision with the object based on the object's track. Subsequently, 620 is performed where method 600 ends or other operations are performed.

Illustrative Vehicle Based Systems

The above described LiDAR system 100 can be used in a plurality of applications. Such applications include, but are not limited to, vehicle based applications. The following discussion is provided to illustrate how the LiDAR system 100 of the present solution can be used to facilitate control of a vehicle (e.g., for collision avoidance and/or autonomous driving purposes). The vehicle can include, but is not limited to, an autonomous vehicle.

Figure 7:
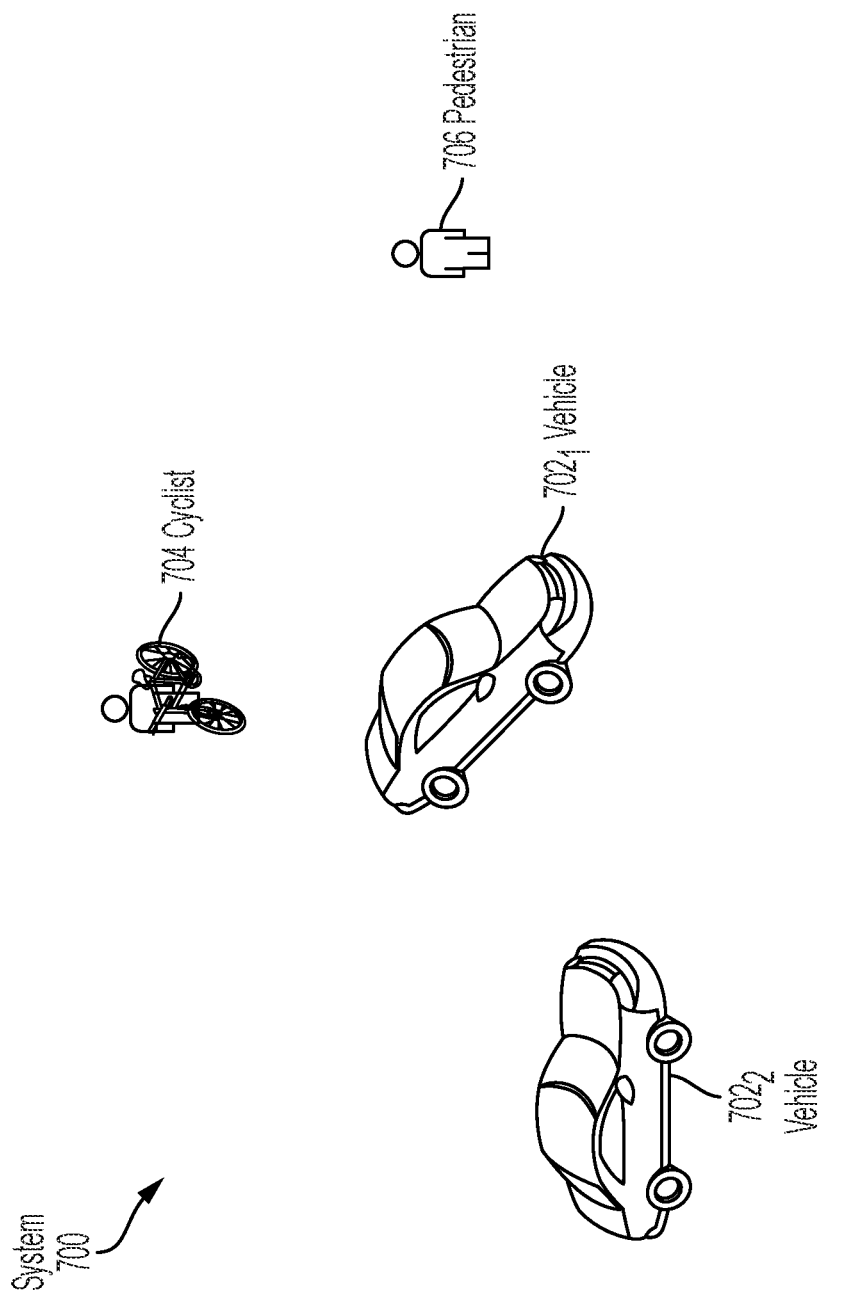
FIG. 7 provides an illustration of a system implementing the LiDAR system described in relation to FIGS. 1-6.

Referring now to FIG. 7, there is provided an illustration of an illustrative system 700. System 700 comprises a vehicle $702_1$ that is traveling along a road in a semi-autonomous or autonomous manner. Vehicle $702_1$ is also referred to herein as an Autonomous Vehicle ("AV"). The AV $702_1$ can include, but is not limited to, a land vehicle (as shown in FIG. 7), an aircraft, a watercraft, or a spacecraft.

AV $702_1$ is generally configured to detect objects $702_2$, 704, 706 in proximity thereto. The objects can include, but are not limited to, a vehicle $702_2$, cyclist 704 (such as a rider of a bicycle, electric scooter, motorcycle, or the like) and/or a pedestrian 706. When such a detection is made, AV $702_1$ performs operations to: generate one or more possible object trajectories for the detected object; and analyze at least one of the generated possible object trajectories to determine a vehicle trajectory for AV $702_1$. The AV $702_1$ is then caused to follow the vehicle trajectory.

Figure 8:
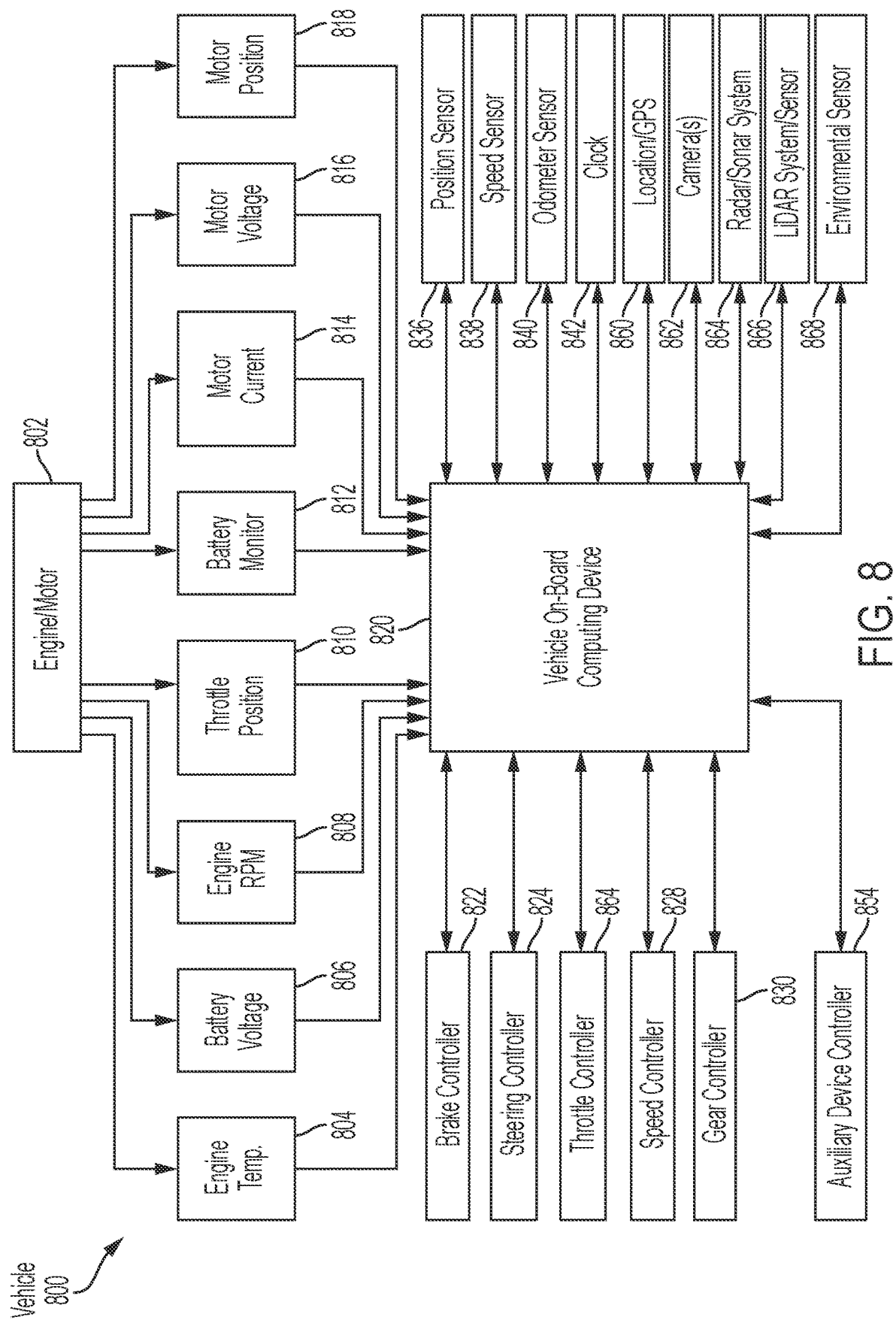
FIG. 8 is an illustration of an architecture for a vehicle.

Referring now to FIG. 8, there is provided an illustration of an illustrative system architecture 800 for a vehicle. Vehicles $702_1$ and/or $702_2$ of FIG. 7 can have the same or similar system architecture as that shown in FIG. 8. Thus, the following discussion of system architecture 800 is sufficient for understanding vehicle(s) $702_1$, $702_2$ of FIG. 7.

As shown in FIG. 8, the vehicle 800 includes an engine or motor 802 and various sensors 804-818 measuring various parameters of the vehicle. In gas-powered or hybrid vehicles having a fuel-powered engine, the sensors may include, for example, an engine temperature sensor 804, a battery voltage sensor 806, an engine rotations per minute (RPM) sensor 808, and a throttle position sensor 810. If the vehicle is an electric or hybrid vehicle, then the vehicle may have an electric motor, and accordingly will have sensors such as a battery monitoring system 812 (to measure current, voltage and/or temperature of the battery), motor current 814 and temperature 816 sensors, and motor position sensors such as resolvers and encoders 818.

Operational parameter sensors that are common to both types of vehicles include, for example: a position sensor 836 such as an accelerometer, gyroscope and/or inertial measurement unit; a speed sensor 838; and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 860 (e.g., a Global Positioning System (GPS) device); object detection sensors such as one or more cameras 862; a LiDAR sensor system 866; and/or a radar system 864. LiDAR system 866 is the same as or similar to LiDAR system 100 discussed above in relation to FIGS. 1-7. As such, the above discussion of LiDAR system 100 is sufficient for understanding LiDAR system 866. The sensors also may include environmental sensors 868 such as a precipitation sensor and/or ambient temperature sensor. The object detection sensors may enable the vehicle on-board computing device 820 to detect objects that are within a given distance range of the vehicle 800 in any direction, while the environmental sensors collect data about environmental conditions within the vehicle's area of travel.

During operations, information is communicated from the sensors to the on-board computing device 820. The on-board computing device 820 analyzes the data captured by the sensors, and optionally controls operations of the vehicle based on results of the analysis. For example, the on-board computing device 820 may control: braking via a brake controller 822; direction via a steering controller 824; speed and acceleration via a throttle controller 826 (in a gas-powered vehicle) or motor speed controller 828 (such as a current level controller in an electric vehicle); a differential gear controller 830 (in vehicles with transmissions); and/or other controllers.

Geographic location information may be communicated from the location sensor 860 to the on-board computing device 820, which may then access a map of the environment that corresponds to the location information to determine known fixed features of the environment such as streets, buildings, stop signs and/or stop/go signals. Captured images from the camera(s) 862 and/or object detection information captured from sensors such as LiDAR is communicated to the on-board computing device 820. The object detection information and/or captured images are processed by the on-board computing device 820 to detect objects in proximity to the vehicle 800. Any known or to be known technique for making an object detection based on sensor data and/or captured images can be used in the embodiments disclosed in this document.

When such an object detection is made, the on-board computing device 820 performs operations to: generate one or more possible object trajectories for the detected object; and analyze at least one of the generated possible object trajectories to determine if there is a risk of a collision in a threshold period of time (e.g., 1 minute). If so, the on-board computing device 820 performs operations to determine whether the collision can be avoided if a given vehicle trajectory is followed by the vehicle 800 and any one of a plurality of dynamically generated emergency maneuvers is performed in a pre-defined time period (e.g., N milliseconds). If the collision can be avoided, then the on-board computing device 820 takes no action to change the vehicle trajectory or optionally causes the vehicle 800 to perform a cautious maneuver (e.g., mildly slows down). In contrast, if the collision cannot be avoided, then the on-board computing device 820 causes the vehicle 800 to immediately take an emergency maneuver (e.g., brakes and/or changes direction of travel).

Figure 9:
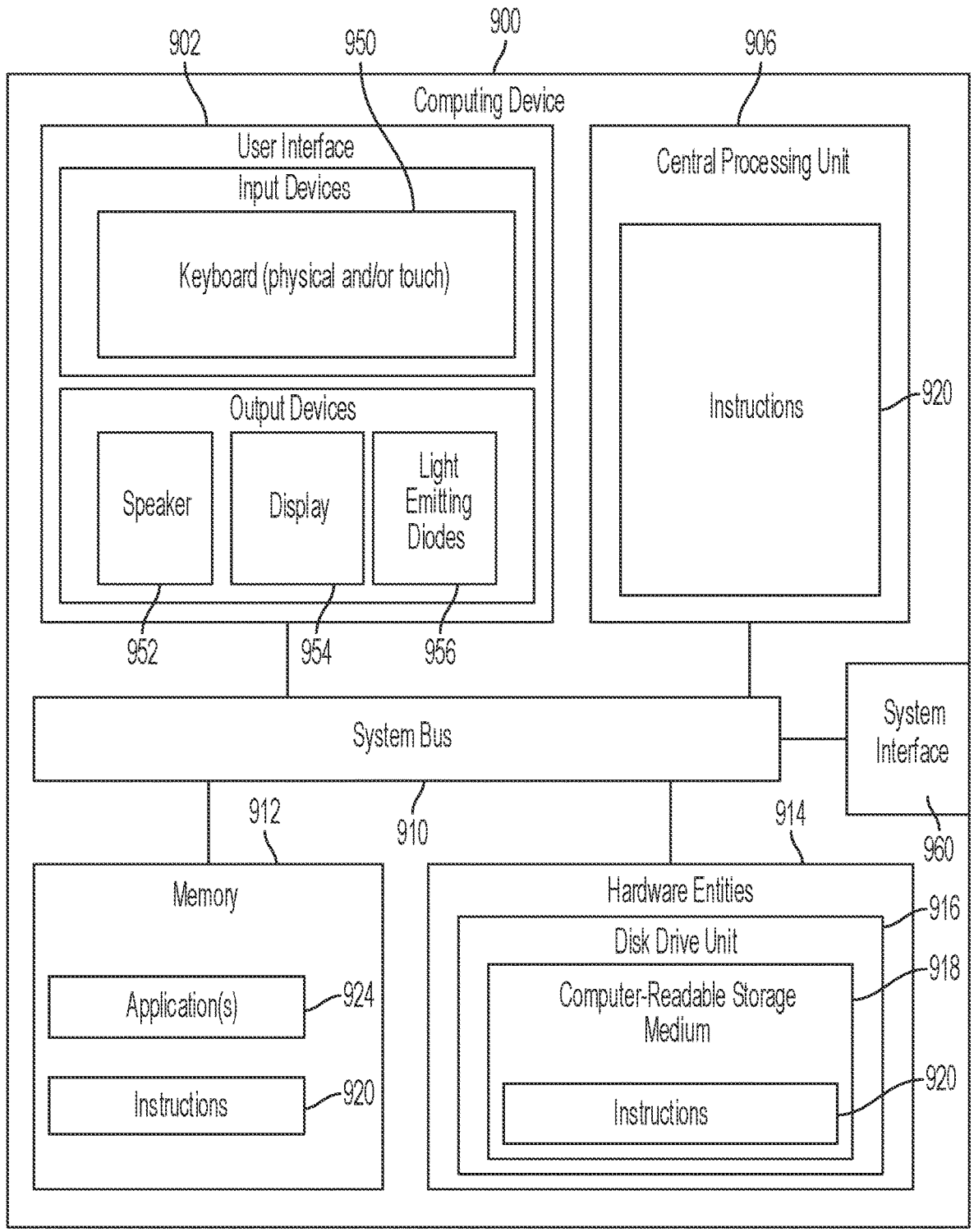
FIG. 9 is an illustration of a computing device.

Referring now to FIG. 9, there is provided an illustration of an architecture for a computing device 900. The object detector 106 of FIG. 1, data processor 110 of FIG. 1, tracker 114 of FIG. 1, LiDAR system 300 of FIG. 3, observation selector 302 of FIG. 3, controller 312 of FIG. 3, filters 306 of FIG. 3, track generator 310 of FIG. 3, LiDAR system 866 of FIG. 8, and/or vehicle on-board computing device 820 of FIG. 8 is(are) at least partially the same as or similar to computing device 900. As such, the discussion of computing device 900 is sufficient for understanding the listed components.

Computing device 900 may include more or less components than those shown in FIG. 9. However, the components shown are sufficient to disclose an illustrative solution implementing the present solution. The hardware architecture of FIG. 9 represents one implementation of a representative computing device configured to operate a vehicle, as described herein. As such, the computing device 900 of FIG. 9 implements at least a portion of the method(s) described herein.

Some or all components of the computing device 900 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 9, the computing device 900 comprises a user interface 902, a Central Processing Unit (CPU) 906, a system bus 910, a memory 912 connected to and accessible by other portions of computing device 900 through system bus 910, a system interface 960, and hardware entities 914 connected to system bus 910. The user interface can include input devices and output devices, which facilitate user-software interactions for controlling operations of the computing device 900. The input devices include, but are not limited to, a physical and/or touch keyboard 950. The input devices can be connected to the computing device 900 via a wired or wireless connection (e.g., a Bluetooth® connection). The output devices include, but are not limited to, a speaker 952, a display 954, and/or light emitting diodes 956. System interface 960 is configured to facilitate wired or wireless communications to and from external devices (e.g., network nodes such as access points, etc.).

At least some of the hardware entities 914 perform actions involving access to and use of memory 912, which can be a Random Access Memory (RAM), a disk drive, flash memory, a Compact Disc Read Only Memory (CD-ROM) and/or another hardware device that is capable of storing instructions and data. Hardware entities 914 can include a disk drive unit 916 comprising a computer-readable storage medium 918 on which is stored one or more sets of instructions 920 (e.g., software code) configured to implement one or more of the methodologies, procedures, or functions described herein. The instructions 920 can also reside, completely or at least partially, within the memory 912 and/or within the CPU 906 during execution thereof by the computing device 900. The memory 912 and the CPU 906 also can constitute machine-readable media. The term "machine-readable media", as used here, refers to a single medium or multiple media (e.g., a centralized or distributed database, and/or associated caches and servers) that store the one or more sets of instructions 920. The term "machine-readable media", as used here, also refers to any medium that is capable of storing, encoding or carrying a set of instructions 920 for execution by the computing device 900 and that cause the computing device 900 to perform any one or more of the methodologies of the present disclosure.

Figure 10:
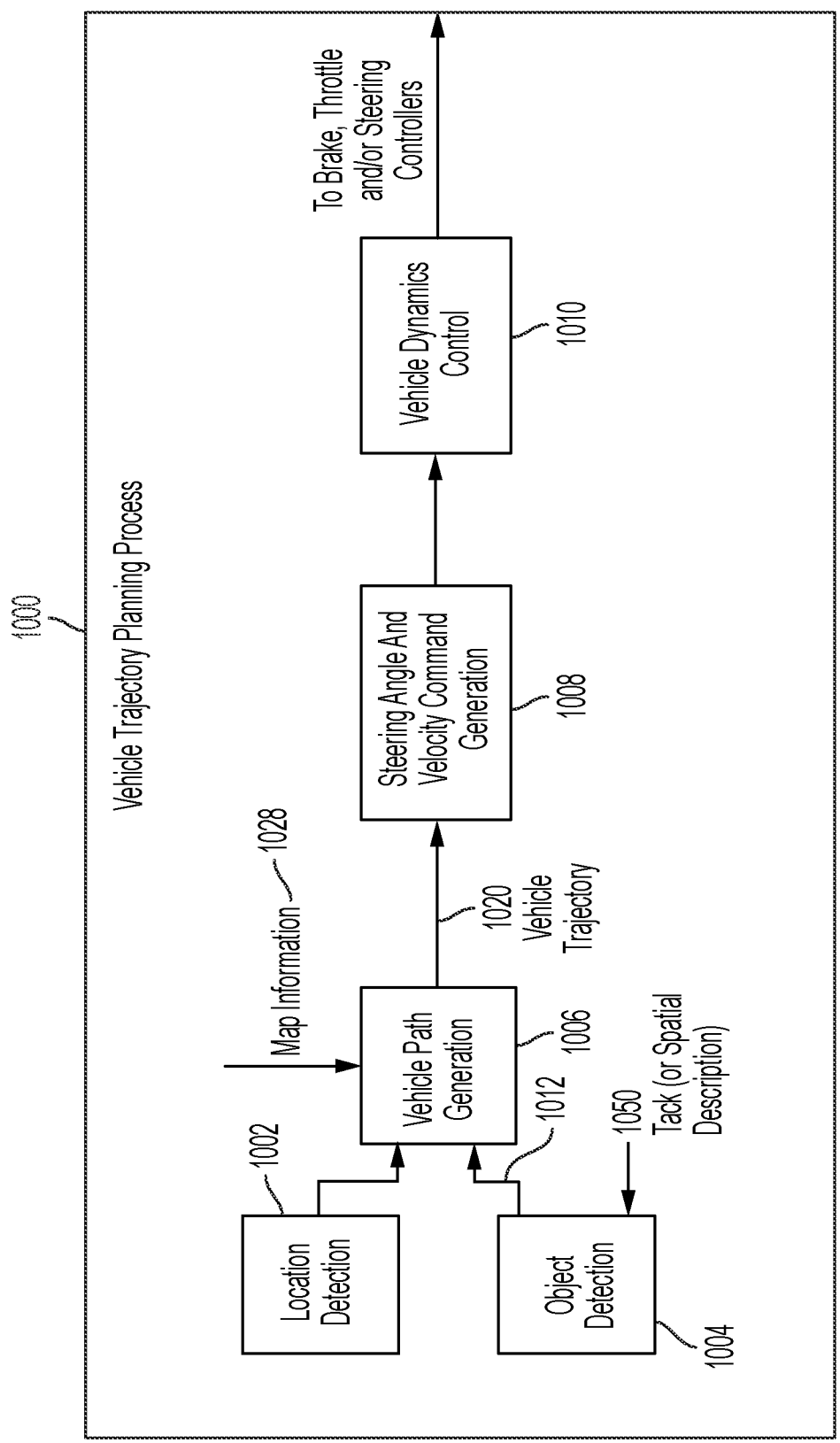
FIG. 10 provides a block diagram that is useful for understanding how control of a vehicle is achieved in accordance with the present solution.

Referring now to FIG. 10, there is provided a block diagram that is useful for understanding how vehicle control is achieved in accordance with the present solution. All of the operations performed in blocks 1002-1010 can be performed by the on-board computing device (e.g., vehicle on-board computing device 820 of FIG. 8) of a vehicle (e.g., AV 702₁ of FIG. 7).

In block 1002, a location of the vehicle is detected. This detection can be made based on sensor data output from a location sensor (e.g., location sensor 860 of FIG. 8) of the vehicle. This sensor data can include, but is not limited to, GPS data. The detected location of the vehicle is then passed to block 1006.

In block 1004, an object is detected within proximity of the vehicle. This detection is made based on sensor data output from a LiDAR system (e.g., LiDAR system 100 of FIG. 1 and/or LiDAR system 866 of FIG. 8), a radar system (e.g., radar system 864 of FIG. 8), and/or a camera (e.g., camera 862 of FIG. 8) of the vehicle. The sensor data output from the LiDAR system includes, but is not limited to, a track (or spatial description) 1050 for the object. The track (or spatial description) 1050 is the same as or similar to track (or spatial description) T of FIG. 1. The sensor data is also used to determine one or more possible object trajectories for the detected object. The possible object trajectories can include, but are not limited to, the following trajectories:
  a trajectory defined by the object's actual speed (e.g., 1 mile per hour) and actual direction of travel (e.g., west);
  a trajectory defined by the object's actual speed (e.g., 1 mile per hour) and another possible direction of travel (e.g., south, south-west, or X (e.g., 40°) degrees from the object's actual direction of travel in a direction towards the AV) for the object;
  a trajectory defined by another possible speed for the object (e.g., 2-10 miles per hour) and the object's actual direction of travel (e.g., west); and/or
  a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object.

The one or more possible object trajectories 1012 is(are) then passed to block 1006.

In block 1006, a vehicle trajectory 1020 is generated using the information from blocks 1002 and 1004. Techniques for determining a vehicle trajectory are well known in the art, and therefore will not be described herein. Any known or to be known technique for determining a vehicle trajectory can be used herein without limitation. In some scenarios, the vehicle trajectory 1020 is determined based on the location information from block 1002, the object detection/trajectory information from block 1004, and map information 1028 (which is pre-stored in a data store of the vehicle). The vehicle trajectory 1020 represents a smooth path that does not have abrupt changes that would otherwise provide passenger discomfort. The vehicle trajectory 1020 is then provided to block 1008.

In block 1008, a steering angle and velocity command is generated based on the vehicle trajectory 1020. The steering angle and velocity command is provided to block 1010 for vehicle dynamics control. The vehicle dynamics control cause the vehicle to decelerate, cause the vehicle to accelerate, and/or cause the vehicle to change its direction of travel.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for tracking an object, comprising:
   receiving, by a processor, a series of observations made over time for the object;
   selecting, by the processor, a plurality of sets of observations using the series of observations for a plurality of filters, wherein at least two sets of observations among the plurality of sets of observations comprise at least one observation in common;
   causing, by the processor, the plurality of sets of observations to be used by the plurality of filters to generate a track for the object, wherein the plurality of filters uses sensor data associated with each frame of a plurality of frames of sensor data only once during generation of the track; and
   causing, by the processor, operations of an autonomous robot to be controlled based on the track for the object.

2. The method according to claim 1, wherein each observation of said series of observations is defined by a cuboid comprising LiDAR data points.

3. The method according to claim 1, wherein each observation of said series of observations is associated with a single frame of the plurality of frames of sensor data.

4. The method according to claim 1, wherein at least one filter of the plurality of filters comprises a Kalman filter.

5. The method according to claim 1, further comprising causing the plurality of sets of observations to be used by a first filter and a second filter to generate the track for the object, wherein the plurality of filters comprises the first and second filters and each of the first and second filters uses sensor data associated with each of the plurality of frames of sensor data only once during generation of the track.

6. The method according to claim 5, wherein the track comprises a sequence of object states sequentially generated by the first and second filters using respective ones of the plurality of sets of observations.

7. The method according to claim 1, wherein said plurality of sets of observations are selected from the series of observations to ensure that the plurality of filters uses sensor data associated with each of a plurality of frames of sensor data only once during generation of the track.

8. The method according to claim 1, wherein the autonomous robot comprises an autonomous vehicle.

9. A system, comprising:
   a processor; and
   a non-transitory computer-readable storage medium comprising programming instructions that are configured to cause the processor to implement a method for controlling an autonomous robot, wherein the programming instructions comprise instructions to:
   receive a series of observations made over time for an object;
   select a plurality of sets of observations using the series of observations for a plurality of filters, wherein at least two sets of observations among the plurality of sets of observations comprise at least one observation in common;
   cause the plurality of sets of observations to be used by the plurality of filters to generate a track for the object, wherein the plurality of filters uses sensor data associated with each frame of a plurality of frames of sensor data only once during generation of the track; and
   cause operations of the autonomous robot to be controlled based on the track for the object.

10. The system according to claim 9, wherein each observation of said series of observations is defined by a cuboid comprising LiDAR data points.

11. The system according to claim 9, wherein each observation of said series of observations is associated with a single frame of the plurality of frames of sensor data.

12. The system according to claim 9, wherein at least filter of the plurality of filters comprises a Kalman filter.

13. The system according to claim 9, wherein the programming instructions further comprise instructions to cause the plurality of sets of observations to be used by a first filter and a second filter to generate the track for the object, wherein said plurality of filters comprises said first and second filters and each of the first and second filters uses sensor data associated with each of the plurality of frames of sensor data only once during generation of the track.

14. The system according to claim 13, wherein the track comprises a sequence of object states sequentially generated by the first and second filters using respective ones of the plurality of sets of observations.

15. The system according to claim 9, wherein said plurality of sets of observations are selected from the series of observations to ensure that the plurality of filters uses sensor data associated with each of a plurality of frames of sensor data only once during generation of the track.

16. A computer program product comprising a memory and programming instructions that are configured to cause a processor to:
   receive a series of observations made over time for an object;
   select a plurality of sets of observations using the series of observations for a plurality of filters, wherein at least two sets of observations among the plurality of sets of observations comprise at least one observation in common;
   cause the plurality of sets of observations to be used by the plurality of filters to generate a track for the object, wherein the plurality of filters uses sensor data associated with each of a plurality of frames of sensor data only once during generation of the track; and
   cause operations of an autonomous robot to be controlled based on the track for the object.

* * * * *